US009242286B2

(12) United States Patent
Maravic et al.

(10) Patent No.: US 9,242,286 B2
(45) Date of Patent: Jan. 26, 2016

(54) COOKING UTENSIL WITH A DEFORMATION-FREE BASE, AND METHOD FOR PRODUCING SAID COOKING UTENSIL

(75) Inventors: Dusko Maravic, Basel (CH); Sebastian Rastberger, Basel (CH)

(73) Assignees: Johan Laubscher, Sommerset West (ZA); Dusko Maravic, Basel (CH); Sebastian Rastberger, Basel (CH)

( * ) Notice: Subject to any disclaimer, the term of this patent is extended or adjusted under 35 U.S.C. 154(b) by 0 days.

(21) Appl. No.: 13/643,525

(22) PCT Filed: Apr. 20, 2011

(86) PCT No.: PCT/CH2011/000089
§ 371 (c)(1),
(2), (4) Date: Oct. 25, 2012

(87) PCT Pub. No.: WO2011/134093
PCT Pub. Date: Nov. 3, 2011

(65) Prior Publication Data
US 2013/0068775 A1 Mar. 21, 2013

(30) Foreign Application Priority Data

Apr. 25, 2010 (CH) .......................................... 749/10
Feb. 18, 2011 (CH) .......................................... 294/11

(51) Int. Cl.
*B21D 22/20* (2006.01)
*A47J 27/00* (2006.01)
*B21D 51/22* (2006.01)

(52) U.S. Cl.
CPC ............... *B21D 22/20* (2013.01); *A47J 27/002* (2013.01); *B21D 51/22* (2013.01)

(58) Field of Classification Search
CPC ....... A47J 27/002; B21D 51/22; B21D 22/20; B65D 1/28; B21K 21/00
USPC .......... 220/62.13, 62.16–62.17, 573.1, 573.3, 220/626, 912; 219/620–621, 625; 72/347
See application file for complete search history.

(56) References Cited

U.S. PATENT DOCUMENTS 2,471,663 A * 5/1949 Tietz .............................. 228/155
3,445,630 A * 5/1969 Ulam ............................. 219/438
3,825,993 A * 7/1974 McGinnis et al. ............ 228/101

(Continued)

FOREIGN PATENT DOCUMENTS

| EP | 1878367 A1 | 1/2008 |
| FR | 2755887 A1 * | 5/1998 |
| GB | 2034173 A | 6/1980 |

OTHER PUBLICATIONS

International Search Report for corresponding International Application No. PCT/CH2011/000089.

*Primary Examiner* — Bryon Gehman
*Assistant Examiner* — Brijesh V. Patel
(74) *Attorney, Agent, or Firm* — Egbert Law Offices, PLLC

(57) ABSTRACT

A multilayer cookware article has an inner metal sheet and an outer metal sheet defining a flat bottom and a side wall connected to the bottom by a rounding. The flat bottom has at least one intermediate layer positioned between the inner sheet and the outer sheet. The intermediate layer has a diameter limited to a diameter of the flat bottom including the rounding. The side wall has an intermediate layer located between the inner sheet and the outer sheet. The intermediate layer of the side wall is mechanically separated from the intermediate layer of the bottom.

2 Claims, 6 Drawing Sheets

(56) References Cited

U.S. PATENT DOCUMENTS

| | | | |
|---|---|---|---|
| 4,204,607 A * | 5/1980 | Zani | 220/626 |
| 4,499,152 A * | 2/1985 | Green et al. | 428/448 |
| 4,541,411 A * | 9/1985 | Woolf | 126/390.1 |
| 4,596,236 A * | 6/1986 | Eide | 219/621 |
| 4,607,512 A * | 8/1986 | Deville | 72/46 |
| 4,646,935 A * | 3/1987 | Ulam | 220/573.1 |
| 4,653,469 A * | 3/1987 | Miyaji et al. | 126/390.1 |
| 4,818,350 A * | 4/1989 | Batzar | 205/188 |
| 5,064,055 A * | 11/1991 | Bessenbach et al. | 220/626 |
| 5,487,329 A * | 1/1996 | Fissler | 99/403 |
| 5,497,696 A * | 3/1996 | Coudurier et al. | 99/422 |
| 5,532,461 A * | 7/1996 | Crummenauer et al. | 219/621 |
| 5,694,674 A * | 12/1997 | Flammang | 29/460 |
| 5,782,375 A * | 7/1998 | McHenry et al. | 220/62.12 |
| 5,881,635 A * | 3/1999 | Muller | 99/403 |
| 6,360,423 B1 * | 3/2002 | Groll | 29/527.2 |
| 6,422,233 B1 * | 7/2002 | Bhagat | 126/390.1 |
| 6,942,935 B2 * | 9/2005 | Ge | 428/698 |
| 7,168,148 B2 * | 1/2007 | Groll | 29/460 |
| 7,337,518 B2 * | 3/2008 | Cheng | 29/505 |
| 7,353,981 B2 * | 4/2008 | Groll | 228/190 |
| 7,571,530 B2 * | 8/2009 | Park | 29/458 |
| 2003/0022027 A1 * | 1/2003 | Groll | 428/698 |
| 2003/0160053 A1 * | 8/2003 | Kim | 220/573.1 |
| 2005/0204928 A1 * | 9/2005 | Bourdin et al. | 99/403 |
| 2005/0205582 A1 * | 9/2005 | Cheng | 220/573.3 |
| 2005/0205646 A1 * | 9/2005 | Cheng | 228/101 |
| 2006/0091183 A1 * | 5/2006 | Cheng et al. | 228/101 |
| 2006/0196877 A1 * | 9/2006 | Droese | 220/573.3 |
| 2007/0000915 A1 * | 1/2007 | Cheng | 219/621 |
| 2007/0051731 A1 * | 3/2007 | Cheng | 220/573.1 |
| 2008/0142526 A1 * | 6/2008 | Cheng et al. | 220/573.1 |
| 2008/0156810 A1 * | 7/2008 | Cheng | 220/573.1 |
| 2009/0127268 A1 * | 5/2009 | Cuillery et al. | 220/573.1 |
| 2010/0140276 A1 * | 6/2010 | Cuillery et al. | 220/573.2 |
| 2011/0056956 A1 * | 3/2011 | Cheng | 220/573.1 |
| 2011/0139795 A1 * | 6/2011 | Cheng | 220/573.1 |

* cited by examiner

COOKING UTENSIL WITH A DEFORMATION-FREE BASE, AND METHOD FOR PRODUCING SAID COOKING UTENSIL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

Cookware with a warp-free bottom and process to its manufacture.

2. Description of Related Art Including Information Disclosed Under 37 CFR 1.97 and 37 CFR 1.98.

GENERAL

The cookware field is, in a technological sense, a very conservative branch. With a few exceptions, such as sandwich bottom and double wall, this field can make no meaningful technical innovation. And that which was accomplished in terms of so-called innovation could not, due to cost reasons, become very popular in the market place (double wall). What is considered innovation in this field is simply a design solution with one single aim in mind: to be able to make a bigger profit. Technical innovations, which could be concerned with results such as lower operating temperatures, lower energy consumption, etc., have unfortunately not been made. And it is precisely through cookware that the key to all advantages, hitherto un-obtained, are nevertheless still obtainable in the field of cooking and frying. Certainly the energy efficiency will gain more and more importance and it is therefore to be expected that cookware too will be even more emphatically subjected to this criteria.

Apart from its primary function of being a container in which food is prepared, it is also expected cookware that it meets other criteria such as user-friendliness and ease of cleaning, "speed" (and reaction time, respectively), design, contribution to efficient cooking/frying, etc. Each one of these requirements has an aim in itself and modern-day cookware fulfills most of them thoroughly. What is nevertheless still lacking is energy-friendly cookware. Energy-friendly means a short reaction time with a minimal energy consumption.

With the present innovation, a description of an energy-friendly cookware and the process of its manufacture is aimed at.

STATE OF THE ART

The most commonly-used cookware stands out due to its simple construction. Cookware consists of a one-piece body, which is reinforced in its bottom part. The body, as a rule, is made by means of thermoforming. One places an approx. 1 mm-thin round disc of stainless steel into a press and forms it into a capsule, also known as the body, by means of the so-called thermoforming. After deburring, polishing, handle welding and bottom lathing, the cookware can be used. The bottom reinforcement consists of a sandwich, consisting of several millimeters-thick aluminum discs and a stainless steel disc, often less than 1 mm thick. This reinforcement is necessary so that, following heating of the cookware, the bottom movement is minimized. If multiple layers (so-called bonded materials), referred to as "multiply", are used, then it is not absolutely necessary to incorporate the reinforcing. The curving of the bottom is also called bottom indention and is, as a rule, less than 1 mm big. The bottom reinforcement follows, in practice, by means of brazing or by means of hammering. The bottom is not allowed to lead to instability of the cookware under any circumstances ("dancing" pot). AS the bottom and the cylindrical part of the pot consist of a single piece, warping of the bottom of the cookware during heating cannot be avoided, regardless whether the cookware in question is single-layer or multilayer cookware. The laws of physics does not allow for any other results. Good cookware may not allow for any, or at least no significant bottom movement.

Modern cookware is rigid and everything but deformation-free during cooking and/or frying. In other words conventionally manufactured cookware is subject to constant bottom movement during cooking and/or frying and is thus not suited to ground temperature regulation. Energy-efficient cooking and/or frying is not possible. The unnecessarily high operating temperatures of cooking zones are the result of old and outdated cookware technology. As long as one does not change the heating technology of current cooking/frying, it is not absolutely necessary to manufacture cookware with deformation-free bottoms. This would however mean that there is no way to energy-efficient cooking.

A further possibility to accomplish a deformation-free bottom would be by means of two-piece cookware, Patent EP 0 802 756 B1. Such a solution distinguishes itself through essential mechanical processing such as lathing, milling, drilling and welding. This machining technology is not very common in the cookware field, since it is, among other reasons, still quite expensive. This type of cookware has not yet become popular in the marketplace either.

BRIEF SUMMARY OF THE INVENTION

General Section

Cookware with deformation-free bottoms can be manufactured in various ways. One possibility is, see among others the Patent, to machine the bottom, which consists of a separate plate, e.g. through milling, drilling and lathing, and then to join it to the cylindrical part and finally seal it. This process is not field-specific and is thus complex and expensive. A cookware manufacturer has much experience in metal forming (thermoforming) and the handling of surface polishing. From the perspective of the lathing of the bottom, a conventional cookware manufacturer has little experience and possibility to carry out machining work. On the other hand, be is duly proficient in the usage of pneumatic presses (e.g. floor presses) and brazing. The present method distinguishes itself through a technology which a cookware manufacturer knows and is fully proficient in. Furthermore no significant additional costs are incurred in comparison to conventional technology.

Conclusion: The main point for the manufacturer in the present method is the fact that the product, namely cookware, can be manufactured with the technology used in the field. In addition, the necessary working steps are reduced to a minimum. The result is a cost-effective product which is not significantly more expensive than its conventionally-manufactured counterparts.

Technical Section

It is known that bottom deformation occurs when the cookware consists of a single, relatively thick part. As a result of varying temperatures, deformation forces which then lead to bottom movement come into play. A bottom which is not in full-surfaced contact with the beat source leads to bad heat conduction and high system temperatures. The best example of this is the glass ceramic with radiant heating systems. The aim of achieving as solution leads only to a deformation-free bottom. The present innovation likewise distinguishes itself (compared to, among others, patent application) by a deformation-free bottom. It concerns the construction of a cookware bottom which does not warp during cooking and/or frying.

An originally even bottom remains even in every phase of cooking/frying, regardless of whether the cookware or the hotplate is cold or hot. This serves as preliminary information before a detailed description is undertaken.

The primary goal of the present innovation is, as mentioned, to achieve cookware with a deformation-free bottom and this by means of proven technologies. At the same time, a new manufacturing process, which provides the results hoped for, is introduced.

In order to achieve deformation-free cookware by means of existing field technology, not much is required, as the following description illustrates. The only thing that must achieved is the creation of a so-called "zone" in the cookware, so that this can take over the expansion which results from heating. The originally created bottom evenness therefore remains unchanged.

DETAILED DESCRIPTION OF THE INVENTION

Figure 1:
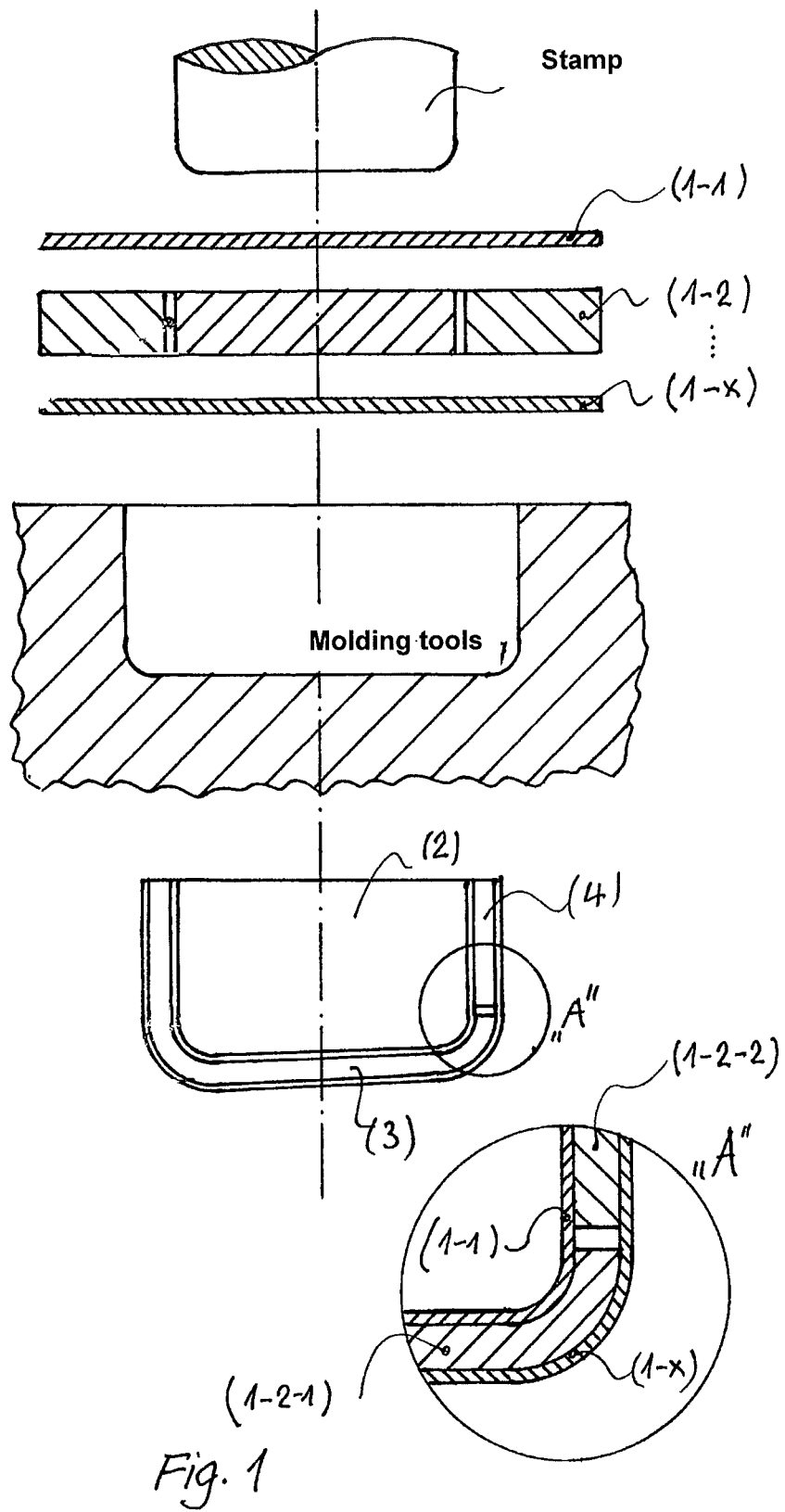
FIG. 1: Schematic presentation of the process of preparing a utensil with a deformation-free base.

The method of manufacture for cookware with a deformation-free bottom is schematically illustrated in FIG. 1.

The inventive process of manufacture for cookware is accomplished by means of the thermoforming of several, separate, layered, specially-shaped metal sheets, also known as rondelles (1). In this way, several convoluted capsules, so to speak, are created, all of which are not yet metallurgically bound with each other. Then, in case this has not yet occurred, the metal plates are soldered only in the bottom part of the cookware, after the thermoforming. The metal plate (1-2) thereby takes on a very special shape, the latter being described in more detail further on in the text.

One thing can however be determined here: with the current solution utilizing several layers, called "Multiply", these are all bonded to each other over their entire surfaces (plated) even before the thermoforming process has begun. The most widely-known multiply plate, often called "rondelle", consists of aluminum with stainless steel on both sides. Other metal combinations are definitely usable, but have not been significantly used for products on the market for various reasons.

Conclusion:

The current technology of thermoforming in the cookware field is not familiar with the multi-layered version with separated round single plates, with special two-piece shaping of a metal plate.

After the cookware body (2) has been debarred, the remaining technological machining steps, that ultimately result in a finished cookware product, are carried out.

The uppermost metal sheet (1-1) is, as a rule, the thinnest and consists of a material compatible with foodstuffs. Its upper surface comes into contact with the foodstuffs and exposes the inner surface of the cookware. Importantly, the material is of the metal sheet (1-1) is made of stainless steel, aluminum, aluminum-alloy and many others.

After the x metal sheets have been formed into the body (2) by means of, e.g. thermoforming, the cookware bottom (3) as well as the cylindrical wall (4) thus consist of X metallic sheets, (1-1, 1-2, . . . up to 1-$x$).

Figure 2:
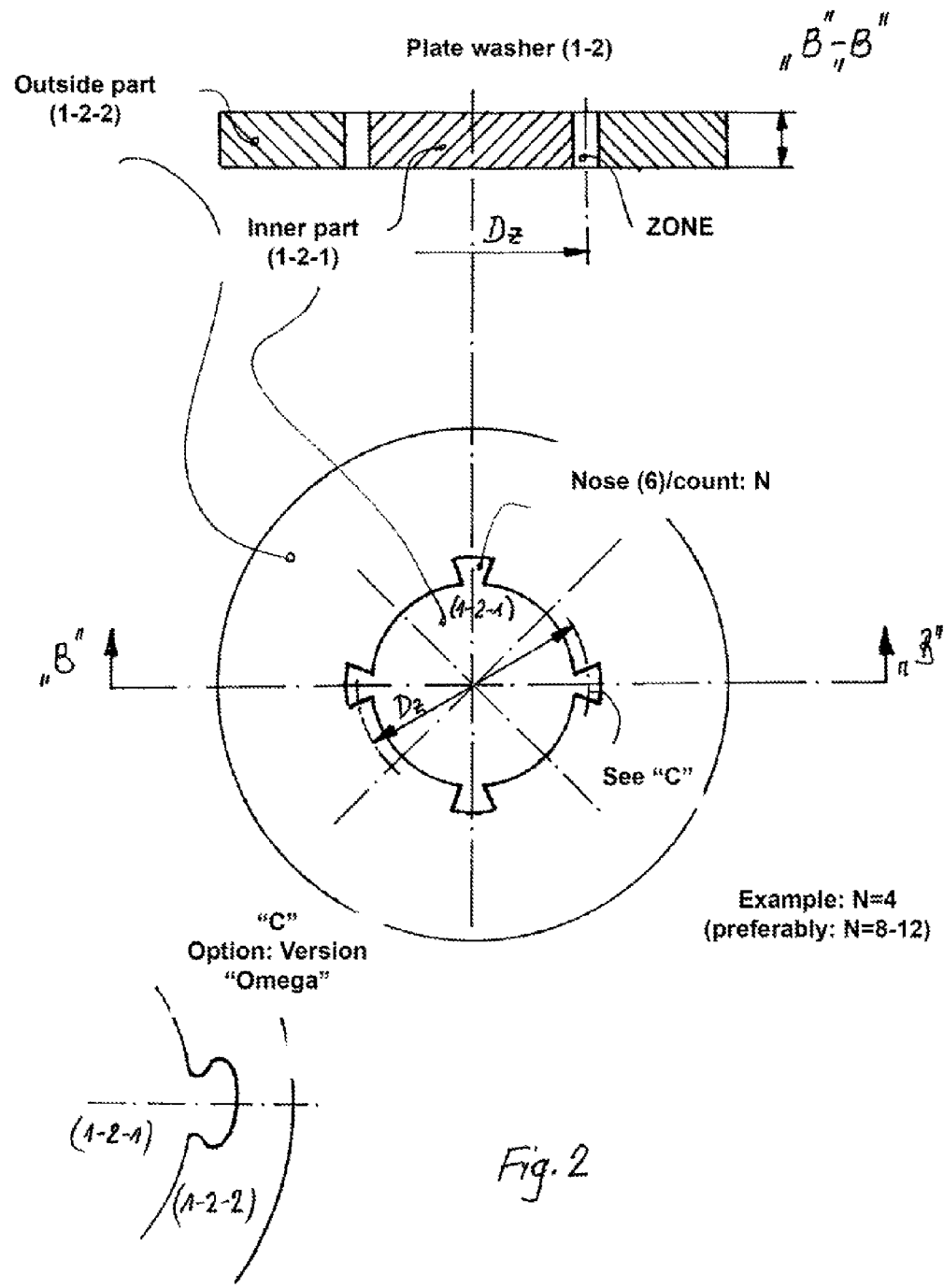
FIG. 2: Schematic presentation of the plate (1-2).

What is then the point of a multi-layered bottom and why does such a solution not lead to bottom formation? The answer to this question is quite simple. Firstly, because the metal sheet (1-2) has been specially shaped, see FIG. 2. Secondly, easily recognizable in FIG. 2, the metal sheet (1-2) consists preferably of two, unbonded, separate pieces. The inner part (1-2-1) makes up the most important part of the bottom after thermoforming. Preferably, material of this metal sheet is made of copper, copper-alloy, aluminum, aluminum-alloy, etc. The outer part (1-2-2) then makes up the most important part of the cylindrical wall (4) of the cookware. This provides for the mechanical stability of the cookware to a considerable degree. Basically all the materials of which the inner part consists can also be used for the outer part. Preferably, the material of the outer part (1-2-2) should be made of aluminum or aluminum-alloy. A preferred material combination selection is e.g. inner part (1-2-1) of copper or copper-alloy and outer part (1-2-2) of aluminum or aluminum-alloy. One of the most important reasons for this combination is, for example, a lighter cookware.

Due to thermoforming-specific reasons, the metal sheet (1-2) should preferably be of uniform thickness at every point. Thus it is only possible to thermoform a fractions-thick, or -thin, respectively, metal sheets (1-1). With the knowledge and experience which the thermoforming technology has collected up to now, even thin, also known as precision-thin, metals can be thermoformed. The technological limitations of a thermoforming process are mainly determined by the type of material being used.

In the following section, the process of how a deformation of the bottom (3) is "spared" from a warping.

In order to obtain a deformation-free bottom, one must first understand how the bottom of a cookware deforms as a result of heating and cooling, respectively, and which parameters have an influence on it. The relevant literature and the applicable norms (e.g. EN 12983) describe the phases which cookware goes through during exposure to heating very comprehensively. Therefore a detailed description has been omitted here. Nevertheless, the basic knowledge of the fact that a body's volume changes during beating is of significant importance in order to be able to understand the following description.

Here is an example: If one places a metallic sheet flush inside a glass tube, somehow seals it (e.g. with silicon), then one has created a primitive form of "cookware". If one then heats up such a container, it will explode after a few seconds. What can one learn from this? Metal expands more and quicker than the glass tube. And what should one then do in order to prevent the glass tube from exploding? Nothing other than providing space, so that the metal can expand freely without the glass exploding. This introduction suffices to understand the innovation.

Figure 3:
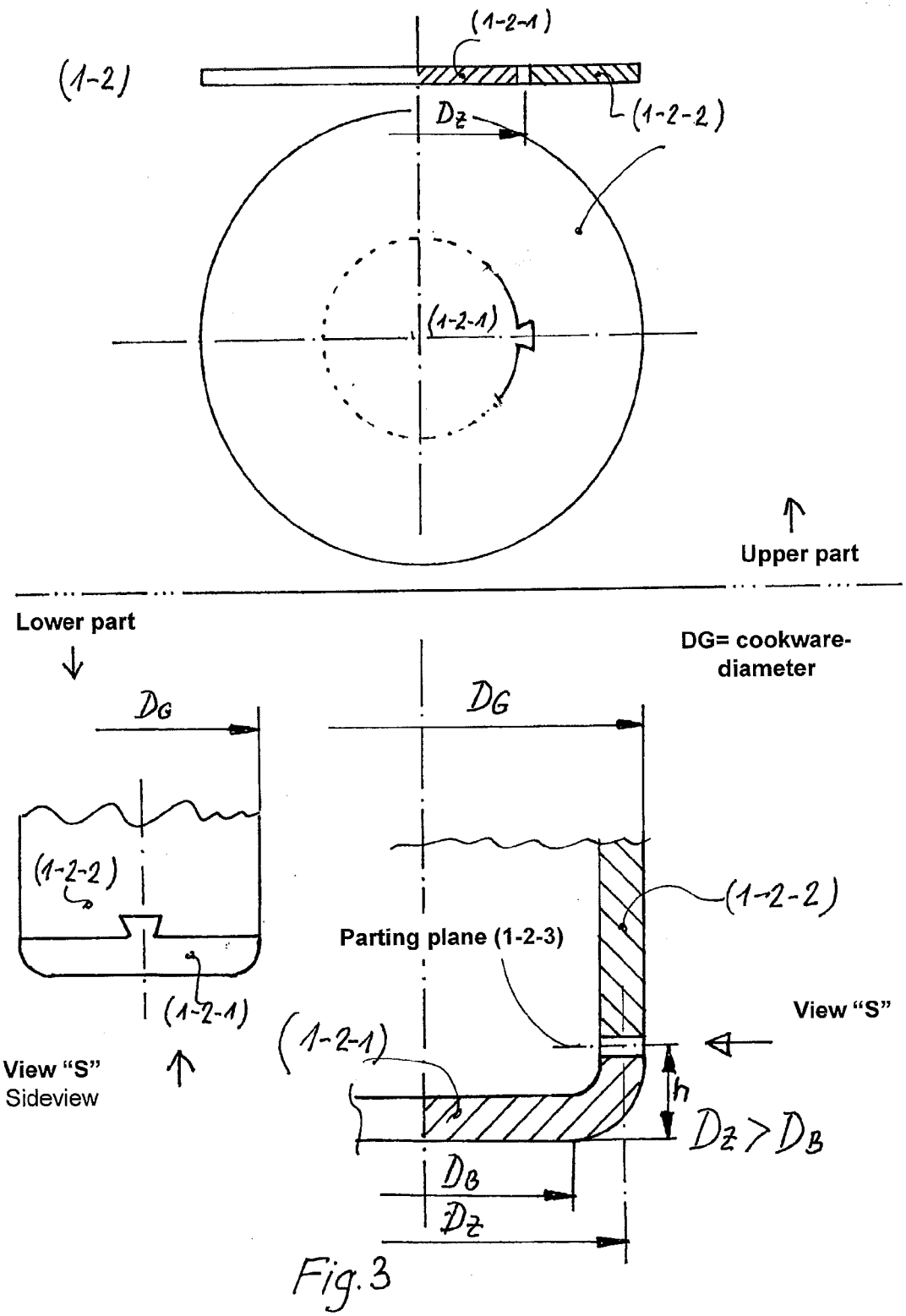
FIG. 3: Schematic presentation of the physics of the deformation-free base of the invention utensils.

Physics of the deformation-free bottom of the innovative cookware:

In the above section of FIG. 3, the metal sheet (1-2) before the thermoforming is illustrated. The inner part (1-2-1) and outer part (1-2-2) are only conditionally bonded to each other. This bonding is only effective in the radial direction. In the axial direction, the parts are as good as disconnected. Before the thermoforming, the two parts, which are followed by the separation plane (1-2-3) too, are on one plane.

In other words, they all preferably have the same thickness. After the thermoforming, the planes are shifted. The largest part of the inner sheet (1-2-1) is located on the bottom plane and the other two on the rotation-symmetrical cylinder plane. Through the thermoforming, the planes shift in such a way that they are preferably at 90° angles to each other, see bottom part of the FIG. 3. This position prevents the separation of metal parts in all directions. In other words, they can no longer be mechanically separated from each other. Despite this fact, a relative movement of the parts is nevertheless possible. So, for example, the metal sheet (1-2-1), when it is heated, can have a larger diameter and expand, without an opposing force of resistance arising. The cylindrically-formed outer pan (1-2-2), temporarily seen somewhat shifted to the back, also warm-up and likewise increases its diameter. Neither side has any significant influence on its opposing counterpart. Significant means not relevant influence on the bottom deformation.

The minimal relative movement between the parts remains, in most cases, (cookware temperature max 250° C., cookware diameter approx. 200 mm) far below a few fractions of a millimeter.

Figure 4:
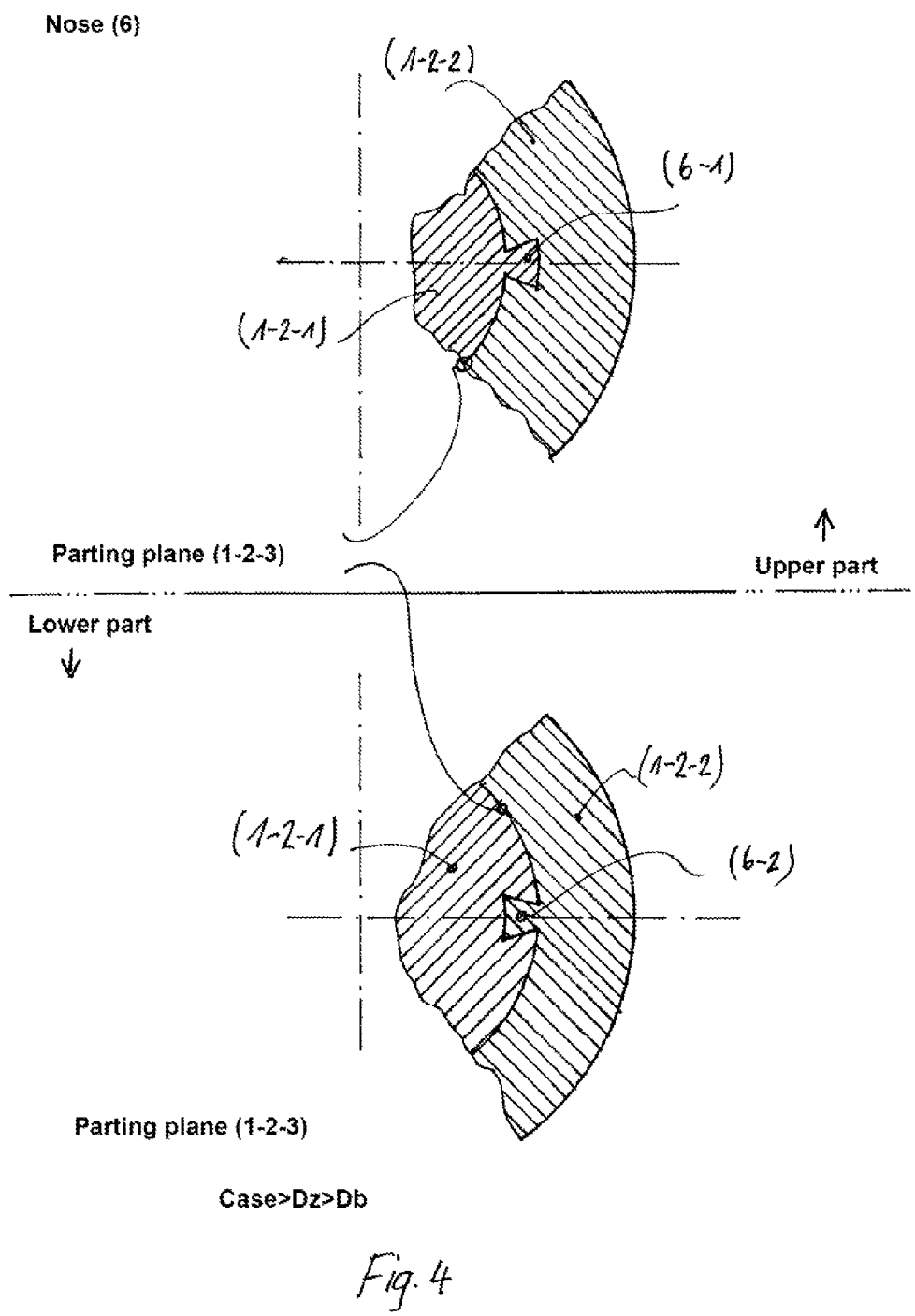
FIG. 4: mechanical connection between the inner plate (1-2-1) and outer plate (1-2-2) of the metal plate (1-2).

The so-called separation plane should be placed near the cookware curving after the thermoforming. Preferably the distance from the bottom h is equal to the curving radius plus approx. 5 mm. Theoretically, the shaping of the separation plane (1-2-3) is not given any guideline. A singular guideline is the radial unseparatability of the sheets (1-2-1) and (1-2-2) after the thermoforming. For specific reasons, which accompany the thermoforming, mechanically stronger material can be chosen for the "bottom-nose" (6-1), see FIG. 4, upper part.

Figure 5:
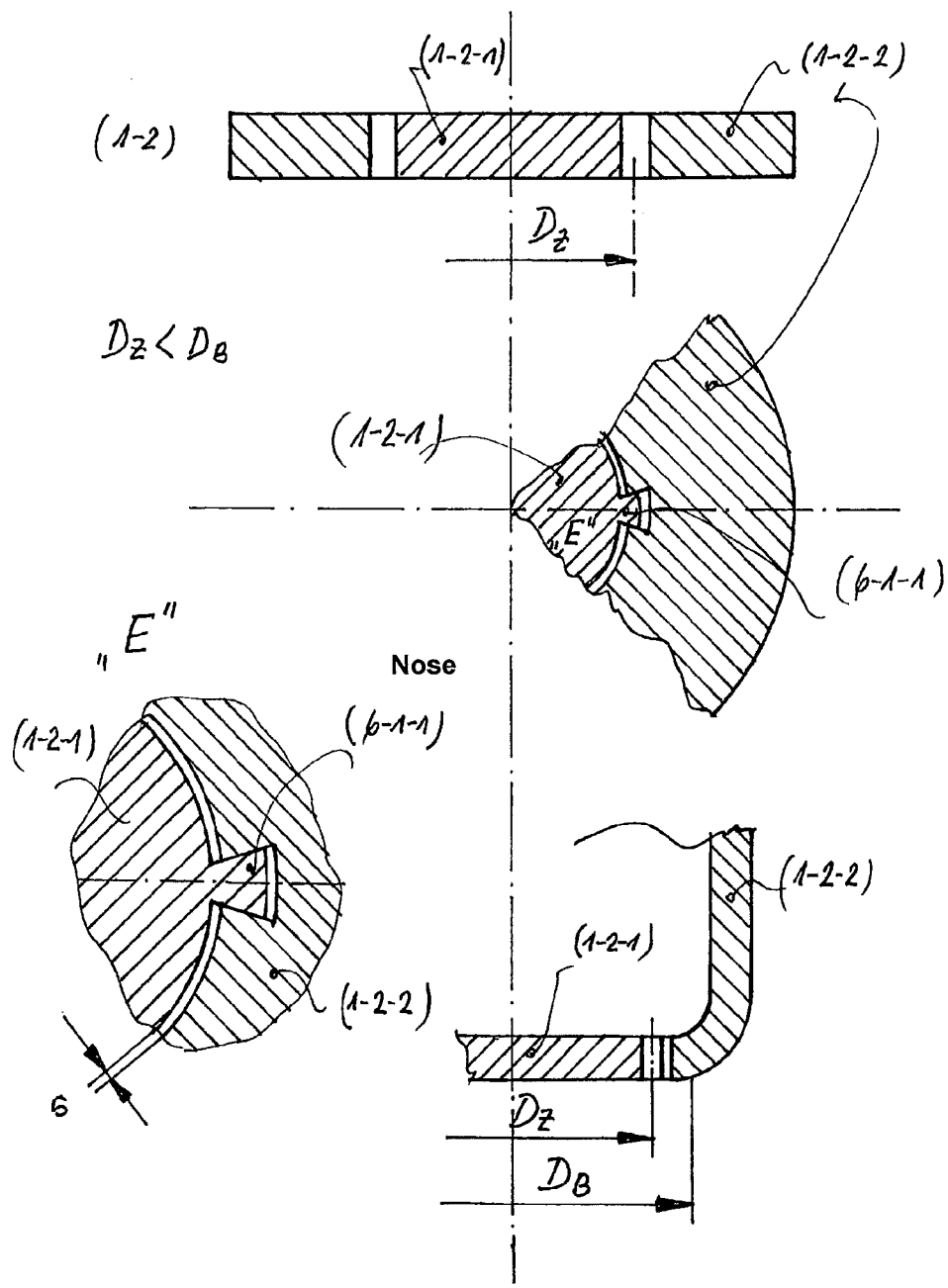
FIG. 5: schematic presentation of the positioning of the separation plane (1-2-3) in the base plane.

There is still the possibility for placing the separation plane (1-2-3) in the flat bottom. In this case a relevant adjustment is to be made, see FIG. 5:

This version shall be useful if the material of the inner plate (1-2-1), for whatever reason, could not be processed by deep drawing operation. Due to the reason, that the inner plate (1-2-1) in the process of heating moves substantially in the radial direction, it is necessary to allow for a sufficient distance S to the outer plate (1-2-2). Subject to this distance being provided, the inner plate (1-2-1) can expand without creation of any significant resistance. Although the plates are made from sheet metal plates (1-1) and (1-x), they are not so large as to cause the warping of the inner plate (1-2-1). It is still to be noted, that the outer plate (1-2-2), presented here in the form of rotationally symmetrical cylinder housing and a sheet-metal plate (1-x), also in the form of rotationally symmetrical, cylindrical outer casing, are not basically interconnected according to the properties of the metal.

Conclusion:

A flat bottom, consisting essentially of the inner plate (1-2-1), expands in the process of the temperature increase, without losing its original flatness. The sheet-metal plates (1.1) and the outer sheet metal plates (1-x) are there to ensure the leak tightness of the utensils. The inner casing, which forms the plate (1-1) by thermoforming, prevents the outflow from the utensil, and the outer shell, formed from the sheet metal plate (1-x), and prevents the penetration of liquids, air, etc. inside, or rather between the layers, which are not soldered together. At the same time they provide for a better mechanical stability of the bottom.

The thickness of the sheet-metal plate (1-2) is determined by the thickness of the sheet-metal plate (1-1). When using a low copper alloy for the bottom plate, for example, it would be preferable to select the metal plate (1-2) of minimum 2 mm thickness. For aluminum and/or its alloys a higher thickness is recommended. In such a situation, the metal plate (1-1) from the stainless steel should not exceed the thickness of half a millimeter. The thickness of the outer metal plate (1-x) should preferably be the same as the thickness (1-1) metal plates, regardless of the material from which it is made. Because these metal plates build the outer housing of the utensil, the material should be treatment friendly.

Polishable materials are preferred in the trade.

It is preferable to have the connection of all metal plates only in the bottom area. In other words, only the inner plate (1-2-1) is connected to metal plates (1-1) and (1-x) in the bottom area. This ensures that no warping occurs in the bottom of the layers and also prevents the warping of the whole bottom. Basically, there are two Ways to connect the layers of the plate together. One is prior to drawing and another is after drawing. There are three available methods: metal bonding, soldering or forging. The decision what is the best method to use must be taken by the utensils manufacture.

The connection between the outer plate (1-2-2) and the metal plates (1-1) or (1-x) is not required, i.e. the plates, which form the cylinder of the utensil, shall not be interconnected. However, if the connection between these plates/layers is required, this shall be allowed only between (1-1) and (1-2-2). The connection between metal of (1-2-2) and (1-x) is to be avoided by all means. Generally speaking, one could get by only with 2 metal plates (1-1) and (2). At any rate, for the case, where the separation plane (1-2-3) is located at h value above the bottom of the utensil, subject to the connection between the inner and the outer plate (1-2-1) and (1-2-2), being waterproof. According to the easily understandable reasons, the separation plane of the two-plate version cannot lay in the bottom plane (the inner plane (1-2-1) falls through!).

On the other hand, the number of the plates sets no functional limits. Everything suggests that the preferable best results are achieved with three plates (1-1), (1-2) and (1-3). The plate (1-2) is further divided into two parts, consisting of the inner plate (1-2-1) and the outer plate (1-2-2). Based on the number, there are four parts, three of which are full circular plates and one as a round plate, in this case specifically the outer plate (1-2-2). Since the inner plate (1-2-1) provides mostly for the maintenance of the flatness of the bottom, it can actually commonly be referred to as 'the bottom plate' or the utensil bottom (3).

Inner plate (1-2-1) should not only be a good thermal conductor, but it should also possess good mechanical properties, such as flexing strength, hardness and ductility. The materials, such as copper and various copper alloys are preferably used. Furthermore, aluminum and various aluminum alloys can be also used. Technically, various steels are used, preferably those that are good heat conductors. All materials, which have been chosen for the material of the inner plate (1-2-1), must be thick enough to prevent from thermo-induction bending. The thickness of the material for the calculation of the thermo-induction bending force is taken in the third degree. The mechanical properties, on the other hand, are linear in the equation. These are the criteria to be considered when choosing the materials.

Generally speaking, the bending of a utensil bottom (put physically identical with a fully clamped circular plate) due to heating is:

1. higher, the greater the heating,
2. higher, the thinner the inner plate (1-2)
3. higher, the larger the dish bottom diameter,
4. higher, the poorer the mechanical properties of the inner plate material,
5. higher, the worse the physical properties of the inner plate material.

The bending property is one of the most important properties tot "Utensil Bottom"

6. higher, the smaller the h distance of the utensil.

Furthermore, for the layman it is quite understandable that a utensil made from a thin, large, highly heated inner plate (1-2) and a relatively mechanically weak material (e.g., aluminum), inevitably results in a large thermal deformation. To keep this deformation as low as possible, it just needs the opposite of these parameters.

The present invention is characterized by the choice of the optimal characteristics in all above 6 parameters.

Optimum results are obtained when one of the materials of the inner plates (1-2-1) is preferably copper or copper alloys with a low alloy. Other materials: are: aluminum and aluminum alloys, and not the least are steels preferably with high thermal conductivity. Other non-metallic materials are generally also applicable, provided they meet required physical properties and are not too expensive.

Optimal thickness of the inner plate (1-2-1) is, in the case of copper or copper alloy at around 2-3 mm. For aluminum, these values should be roughly double, the amount of stainless steel, much like the copper, should be rather low. It must always be ensured that the choice of an inner plate (1-2-1) material and the determination of its thickness must always be made in relation to the choice of the material of the plate (1-1) and its thickness. This results in a variety of possibilities, all of which must have their goal, which is to reduce any cause for the deformation of the bottom.

The optimum choice of the material for the plate (1-1) is preferably stainless steel. Other materials are: aluminum and all food-grade aluminum alloys. Materials such as titanium or other materials, which are suitable for food or are coated with food-grade metals are, in principle, can be used. In this case, the optimal physical properties of the base materials must be taken into consideration. In addition, the chosen materials must allow for the drawing method.

Optimal thickness of the metal plates (1-1) is, in the case of the stainless steel material, a few tenths of a millimeter. For aluminum, this value tends to be somewhat higher, for titanium this value tends to be somewhat lower.

As previously mentioned, the metal connection of the plates (1-1), (1-2-1) and (1-x) between each other may take place before or after the drawing. This is entirely the decision of the utensil manufacturer what methods of production technology and what production costs are acceptable.

Figure 6:
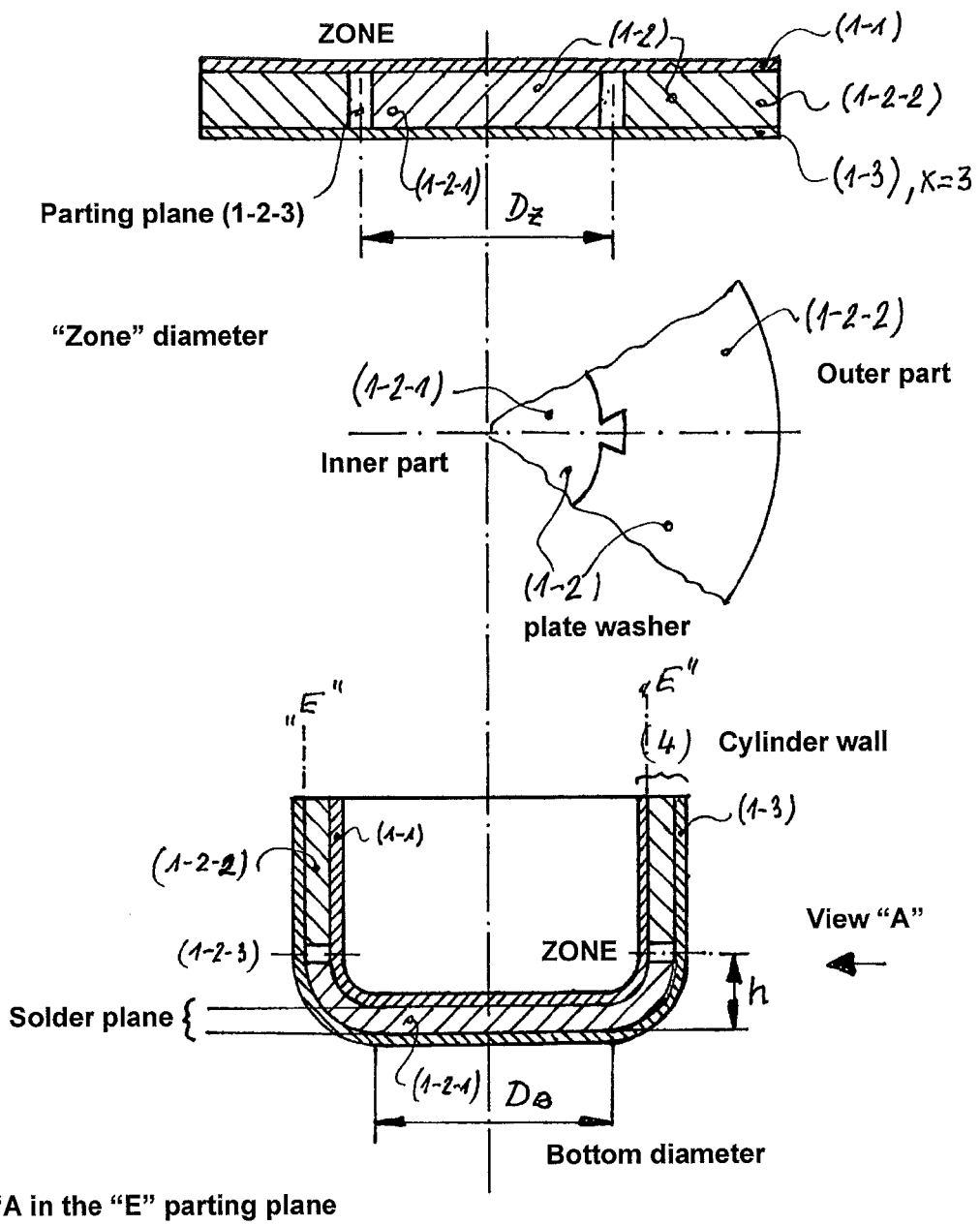
FIG. 6: invention utensils (preferred version).

Based on the above descriptions, the utensil with deformation-free base, should preferably look like in FIG. 6.

The detailed, verbal description is understandably omitted. The main features are shown in FIG. 6 to a sufficient extent.

Addition to previously revealed knowledge.

The above-mentioned description clearly demonstrates that the inner plate (1-2) consists of two non-interconnected pans, made of different materials. On the basis of the experimental results, it was found that the inner plate (1-2) is not necessarily composed of two parts, namely, the inner part (1-2-1) and the outer part (1-2-2). However, the presence of the inner part (1-2-1) is absolutely necessary. The elimination of the outer part (1-2-2) will produce the smallest wall thickness of the utensil. If you keep the outer pan (1-2-2), then you will have thicker utensil walls, but with the advantage that such utensils in the case of preference of a better thermal insulation material for the outer part is not so hot (1-2-2) and, therefore, emits less heat into the surroundings, so, is more energy-efficient.

Thus, it must be noted that the inner plate (1-2) can consist of a variably thick inner part (1-2-1) with and/or without the outer part (1-2-2), without damaging the flatness of the utensil base.

In the case, when the inner plate (1-2) is selected with a version having the outer part (1-2-2), which is a two-piece inner plate (1-2), the two parts are not necessarily connected to one another mechanically, as described in Patent application No 00749/10 (bayonet connection). Whereas, such a solution is not bad, in order to reach the targets, it is absolutely necessary to have the two parts in the base plane, see FIG. 5, where DB is greater than Dz.

Besides the already mentioned possibility of connection between the inner plate (1-2-1) and the plates (1-1) and (1-x) in the base area, see first two lines, Page 7, where laser welding is also considered. Today's laser possibilities allow for more than 10 spot welds per second, making the laser quite competitive, especially when you take into account that a laser can perform multiple spot welds simultaneously (multiple laser heads). To prevent corrosion susceptibility of welds, suitable materials are selected. Where the corrosion resistance cannot be guaranteed, suitable surface protection is necessary.

A round blank, prepared by laser-spot multipart multilayer welding provides various advantages for utensil manufacturers. Easier production with lower production costs (because the base connection is omitted), whereas lower production cost is just one of many specific examples.

The so-called "cold process" in the cookware industry is a novelty. Methods of utensil production, where no soldering, forging, machining or pressing of base is used, especially where the base reinforcement is required, is unknown.

In addition to the above-mentioned ways, the use of steel for the inner part (1-2-1), using ferritic grades of steel, provides for the possibility to make the outer plate (1-x) of a non-magnetic material. The example of a non-ferritic stainless steel, namely an austenitic stainless steel 1.4301, as the material for the outer plate (1-x), shows that the cookware is suitable for induction. This fact leads back to the presence of ferritic steel, where only a few tenths of a millimeter thick austenitic stainless steel or other metals are present. In other words, this means that a thin outermost plate (1-x), even if it does not possess the ferritic properties, the induction ability of the ferritic material of the inner plate (1-2-1) is not impaired. The physical limits of this fact depend on many parameters. In the case of this invention for utensil production, we are talking about a few tenths of a millimeter. In the test results, the external plate of 1.4301 was 0.3 mm thick. If one would use other materials such as aluminum, aluminum alloys, copper, copper alloys and other metal and non-metal materials, these values can differ slightly on the strength of stainless steel 1.4301.

It should be noted, that at this stage it cannot be answered, on the basis of what physical grounds the above described property is revealed, whereas it must only be stated that it was found. Nevertheless it should be noted that the magnetic behavior of the utensil base, consisting of an austenitic stainless steel (preferably 1.4301, etc.) and a ferritic steel, either a low magnetization of the stainless steel, reinforced by the immediate (mechanical contact) near the ferritic structural steel or due to a "masking" of the presence of austenitic stainless steel, which is characterized, as though there was not any austenitic stainless steel present at all. The first guess would be something like the amplification of the magnetic effect (permeability) of austenitic stainless steel due to the closeness of the ferritic structural steel. The second assumption, however, would possibly be explained by the magnetic dominance of ferritic structural steel.

General comments on the stress field of the utensil heating method.

The objective of the presented invention is to present the utensils, which would allow for the optimal heating, modern, efficient, safe and healthy cooking and/or frying. In order to achieve the benefits of optimal handling during preparation of the food, it needs temperature control, i.e. the conduction cooking system.

The utensils of the future shall require a deformation-free base. Otherwise, there are no other benefits as energy efficiency, temperature control, etc. This is the fact. The conventional utensils are out. You are on the way to a meaningful development for human well-designed and desired, optimal preparation of food.

To make cooking/frying easier and safer, and to consume as little energy as possible, it still requires humans and the right utensil. Optimal technology means three things: utensils with a deformation-free base, heat source with in-situ heating (conduction) and an electronic temperature control.

Today's culinary arts, respectively, the optimal use of the machine is based mainly on the experience of man. The actual task of the man who cooks is to focus on the optimal preparation of the food and not to be the one who operates the machine optimally. Today's cooking is simply a balancing act between the control devices and food preparation, which is simply wrong. The cooks are expected to deliver delicious and tasty food; they are not expected to provide a certificate for a successful operation of the appliance.

The invention claimed is:

1. A multilayer cookware article comprising: an inner metal sheet and an outer metal sheet defining a flat bottom and a wall connected to said flat bottom by a curving, said flat bottom having at least one intermediate layer positioned between said inner metal sheet and said outer metal sheet, said at least one intermediate layer having a diameter limited to a diameter of the flat bottom, and said wall having another intermediate layer located between said inner metal sheet and said outer metal sheet, and said at least one intermediate layer of said flat bottom being of a material different than a material of said another intermediate layer of said wall.

2. The multilayer cookware article of claim 1, said at least one intermediate layer of said flat bottom being mechanically connected to at least one of said inner metal sheet and said outer metal sheet.

* * * * *